April 25, 1967  F. M. BAILEY ET AL  3,316,392
CODED AUTOMATIC IDENTIFICATION SYSTEM
Filed Nov. 13, 1962  3 Sheets-Sheet 1
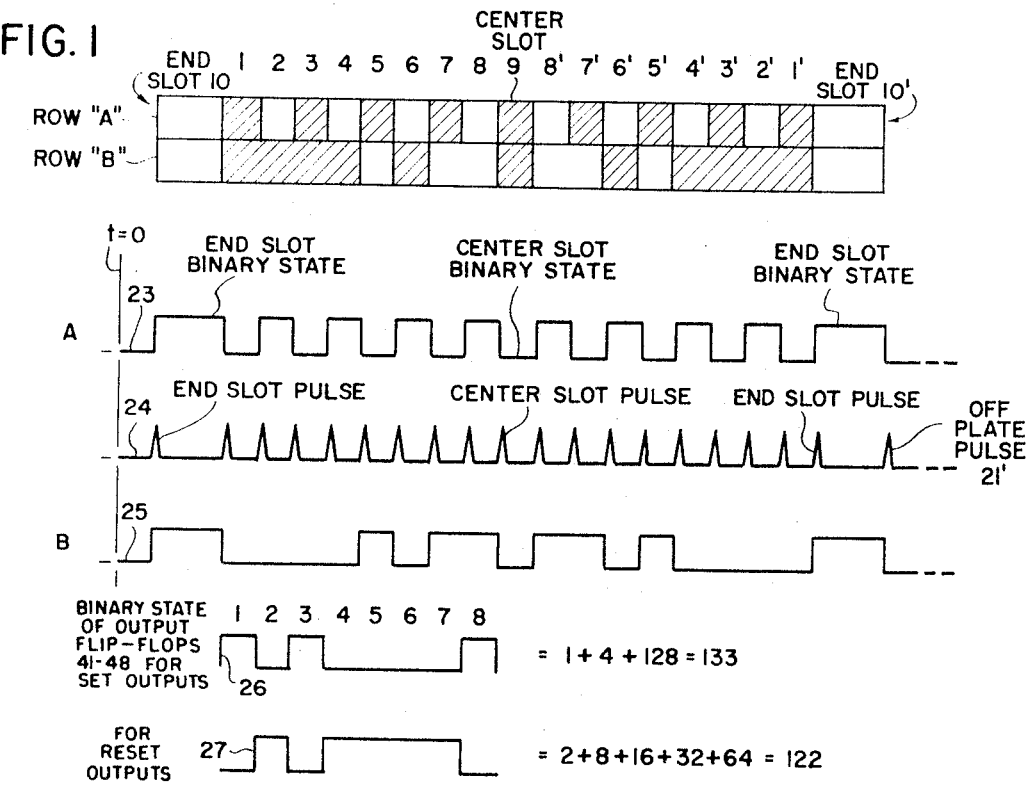
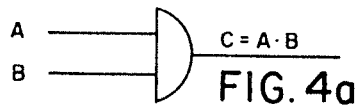
FIG. 4a  $C = A \cdot B$
FIG. 4b  $C = A + B$
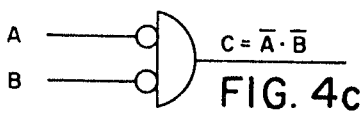
FIG. 4c  $C = \bar{A} \cdot \bar{B}$
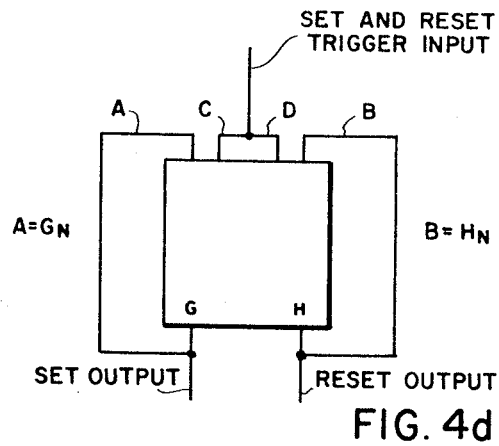
FIG. 4d
| A | B | C = D | $G_N$ | $G_{N+1}$ | $H_N$ | $H_{N+1}$ |
|---|---|---|---|---|---|---|
| 0 | 1 | PULSE PRESENT | 0 | 1 | 1 | 0 |
| 1 | 0 | PULSE PRESENT | 1 | 0 | 0 | 1 |
FIG. 4e
INVENTORS
FRANCIS M. BAILEY
JOHN E. BIGELOW
GORDON E. WALTER
BY
Irving Kayton
ATTORNEY

# United States Patent Office 3,316,392
Patented Apr. 25, 1967

3,316,392
CODED AUTOMATIC IDENTIFICATION SYSTEM
Francis M. Bailey, Roanoke, Va., and John E. Bigelow, Hales Corners, and Gordon E. Walter, Wauwatosa, Wis., assignors to General Electric Company, a corporation of New York
Filed Nov. 13, 1962, Ser. No. 239,865
8 Claims. (Cl. 235—61.12)

This invention relates to digitally coded identification systems and more particularly, to a system for identifying a multiplicity of bi-directionally movable objects, such as railroad cars and other vehicles, or articles moving along a production or distribution line.

It is often useful to be able to identify an object passing a particular location for the purpose of being able to ascertain the location and distribution of an entire population or universe of similar objects. Thus, for example, in the United States, railroad freight cars are loaned or exchanged among the various railroad companies in accordance with the individual railroad's variations in traffic load. Sometimes freight cars owned by one company are scattered throughout the United States, often in unexpected locations. For inventory purposes, and to be able to ascertain the correct charges to be levied on railroad companies for the use of freight cars belonging to other companies, it is necessary to keep track of all the freight cars. Years ago, this was done by having men travel the rails with a ledger book and ascertain the locations and identification of the various cars. Since then, the method of accounting for cars has become somewhat more efficient.

Similarly, information about the location and distribution of items on a traveling line is frequently required. For example, in a large centralized post-office, the location, within the post-office, of the various sacks of mail destined for delivery to widely separated cities and communities throughout the United States, must be kept track of and accounted for.

The need to be able to identify such articles traveling along certain specified paths in a positive, reliable, and automatic manner is an important requirement in a wide variety of activities. In many cases, it is necessary to be able to identify the article even though it may pass before the sensing or identifying mechanism in more than one direction.

It is accordingly an object of this invention to provide an automatic coded identification system for ascertaining the identity of articles traveling along paths wherein the articles may pass the identification point in more than one direction.

It is known in the art to position digitally coded identification devices on articles for automatic sensing, reading, and decoding by appropriate means at the identification point. Typically, such coded devices are not visually readable or decodeable by unskilled personnel since they are ordinarily coded in a non-decimal system. The identification plate may be coded, for example, in binary or binary-coded-decimal form, or any of several esoteric numbering systems. These identification plates are usually secured only temporarily to their respective articles. They are often removed and placed on other articles as the circumstances of the system require. It is important when replacing identification plates that they be displayed right side up so that sensing and reading of the plates by the automatic equipment be done properly. Otherwise, spurious signals may be generated which are not representative of the identifying code for that article. It is possible, of course, to place legends upon the identification plates which are understandable to anyone who can read; however, in order for the use of such legends to help prevent improper orientation of the identification plates there is also required a motivation and responsible attitude which is sometimes absent in the relatively unskilled personnel who may be charged with the task of replacing the identification plates.

Accordingly, it is highly desirable, and it is another object of this invention, to have a digitally coded identification system wherein the identification of the article may be positively and correctly ascertained irrespective of whether an identification plate is placed right side up or upside down.

Often the velocity of motion of the article to be identified in transit past the identification or checkpoint cannot be determined beforehand. Thus, the speed at which a freight car may pass a checkpoint is a function of many non-determinable factors.

It is another object of this invention, therefore, to provide a digitally coded identification system wherein positive identification may be obtained irrespective of the velocity at which the article and the coded indicia thereon pass the sensing or identification checkpoint.

In accordance with the principles of the invention, the above objects are accomplished in a system comprising sensing and decoding sections and an identification plate coded in a manner such that the sensing device can automatically read the code. The coded identification plate has two separate digital channels disposed thereon and the sensing section senses each one separately. The first channel provides periodic and regular pulse signals which serve as a source of reference signals having a dual function. In a first sense, these periodic signals provide a frame of reference with respect of time, i.e., irrespective of the speed with which the article supporting the identification plate passes before the sensing device, the periodic channel is a means for normalizing time in the identification system. This is so because signals from the second channel are always considered relative to those from the first channel. In a second sense, the periodic signals provide the base or reference for generating the numerically coded number of the identification plate. Thus, at one point or slot in the first channel, if a first digital value is represented, e.g., binary zero or one, and the second channel at that slot has the same digital value, then the digital value of the identification plate for that slot is determined by the similarity of the two channel signals in that slot. If the second chanel has a different value from the first channel at that slot, then the digital value of the identification plate for that slot is determined by the signal dissimilarity of the two channels at that slot. Thus, if the sensing device ascertains that a given slot in the first channel contains a binary one signal and at the same slot the second channel also contains a binary one (or both contain a binary zero), then the decoding section recognizes this fact and their sameness is converted into an output binary representation. If the signals in the first and second channels at a given slot have different binary values, then the decoding section recognizes that there is a dissimilarity and generates a binary representation of opposite value from that generated when a similarity is recognized. Thus it is the similarity and dissimilarity between the two channel signals, slot by slot, that defines the digital code number identifying the article upon which the identification plate is located. Whether the first channel is located at the top of the identification plate or at the bottom is therefore immaterial to the correct reading of the identifying code number of the identification plate. Furthermore, the identificaton process is rendered independent of article velocity, since although the coded signals in both channels may vary with time, they will always both vary in the same way and by the same amount.

Since the article may pass the sensing device in two different directions, or more correctly, in one direction but in opposite senses, depending upon whether it is passing from left to right, or right to left in front of the sensor, means are provided in accordance with the principles of the invention to obtain a correct reading of the code number irrespective of which sense it is traveling in. This is accomplished by forming the identification plate such that the identification code pattern is represented on the plate twice with a code pattern which is the mirror image of the other as viewed by the sensing device. Thus, the over-all coding pattern of the plate is symmetrical about a center line transverse to the direction of plate motion. In this way the code number is always read twice; once frontwards and again in a reverse direction irrespective of in which of the two senses the article is traveling in front of the sensor.

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings:

In the drawings:

FIG. 1 is an illustrative example of a coded identification device appropriate for use in a system in accordance with the principles of the invention;

FIG. 2 is a set of curves representative of logic waveforms derived from the identification device of FIG. 1 and the circuits of FIGS. 3 and 5;

FIGS. 4A–4E are logic circuit elements used in the circuit of FIG. 3; and

Figure 3:
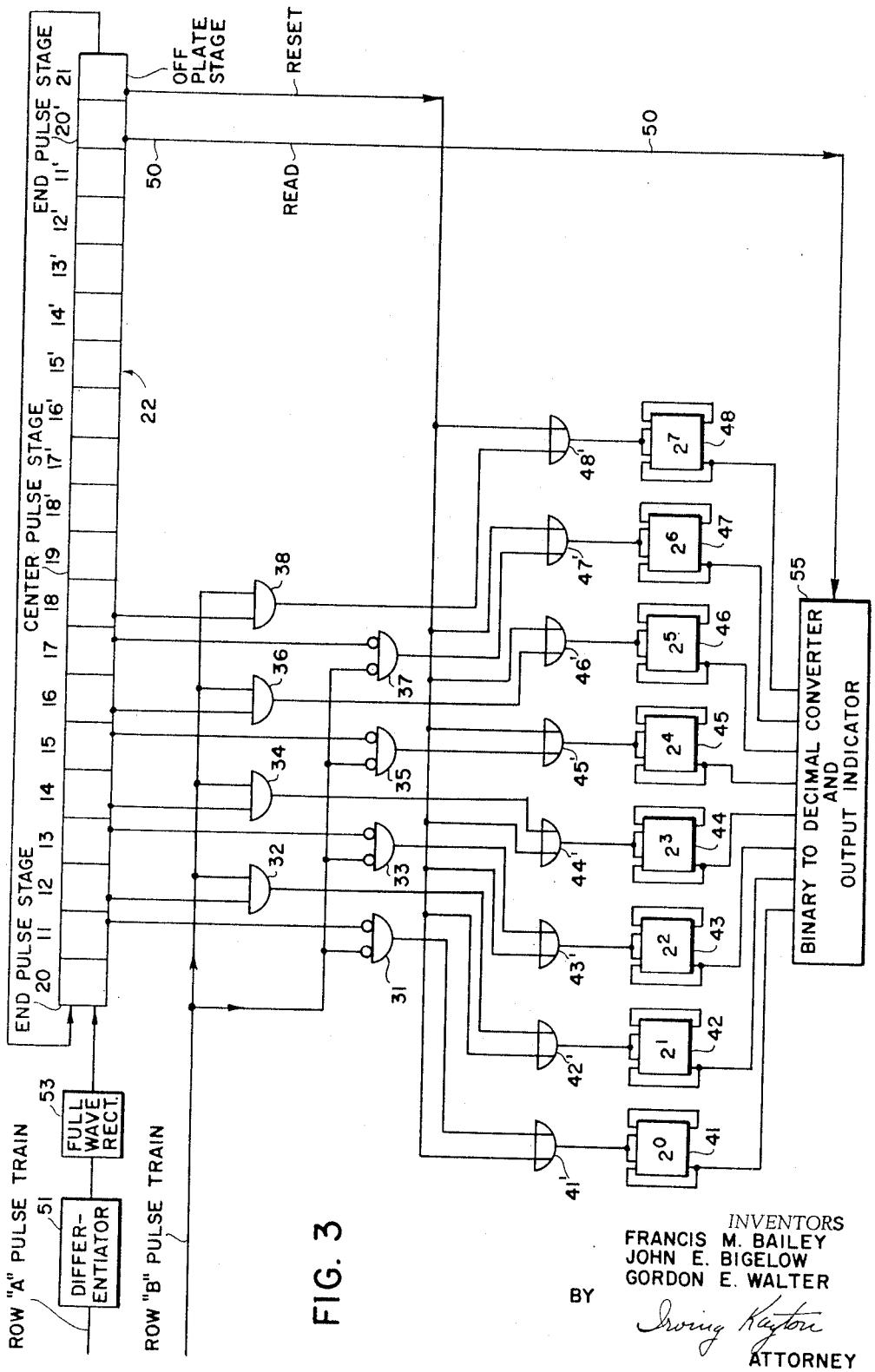
FIG. 3 is a logic diagram of an asynchronous logic circuit for use in the automatic identification system of the invention.

On each of the cars or articles that passes in front of the sensing device there is a binary coded idenfication plate (FIG. 1), rectangular in shape, with its long dimension along the direction of motion relative to the sensor and with its short dimension perpendicular to the direction of motion. The identification plate is positioned so as to permit being sensed by the sensing device as it passes by. The plate is devided into two channels or rows, A and B. The sensing device separately but simultaneously senses each of rows A and B, as will be explained hereinafter in detail. Row A is identifically the same on all of the identification plates on all of the cars or articles. Row B, however, is coded in a unique way relative to row A on each plate so as to represent a number identifying the particular car to which that identification plate is attached.

Row A has its surface divided into areas or slots, alternate ones of which provide an output pulse from the sensing device while the others produce no output pulse. More specifically, the shaded odd-numbered slots are those for which the sensing device provides no output pulse and, therefore indicate a binary zero. The unshaded even-numbered slots do cause the sensing device to produce output pulses and represent, in accordance with the logic notation herein utilized, binary one. In row A, the extreme end slots 10 and 10' represent binary one. Thereafter, the successive slots alternate their logic states across the entire row. Row B also has its end slots 10 and 10' representing binary one. End slots 10 and 10' are means for providing an indication that the identification plate is coming into view of the sensing device; it also indicates that the identification plate is passing from view of the sensing device after the identification plate has traversed its length past the sensor.

Row B is coded, not in the periodic manner of Row A, but in a manner which is designed to uniquely represent a binary number. It should be understood, however, that the number represented by the identification plate cannot be ascertained solely by looking at the binary representations for row B alone. It can only be ascertained by determining the similarities and dissimilarities between rows A and B on a slot-to-slot basis. More specifically, in slot 1, there is binary zero for row A and for row B, while in slot 2 there is a binary one in row A and a binary zero in row B. Thus, slot 1 provides a similarity and represents a binary one in the convention to be followed, while slot 2 provides a dissimilarity and represents a binary zero. This slot sequence of binary numbers is the numerical coding of the identification plate which carries its unique identification number.

It may be noted that the first eight slots 1–8 in both rows A and B after the lefthand end slot 10 are, as a group, the mirror image of the eight slots 1'–8' about the center slot 9. For this reason, irrespective of in which direction the identification plate passes in front of the sensing device, the same sequence of pulses is generated. Furthermore, even if the coded identification plate is turned upside down, i.e. rows A and B interchanged, the unique numeral representation for that particular plate remains the same from the point of view of the decoding device since the numeral representation is determined by the binary similarities and dissimilarities between the top and bottom rows which are invariant.

The sensing device generates an output pulse train for row A such as is shown in curve 23, FIG. 2 (time proceeds from left to right). The row A pulse train is applied as an input on the A input lead of the asynchronous logic circuit, FIG. 3, which comprises the decoding device of the system. The sensing device will be described below.

The row A input lead is applied to a typical differentiating circuit 51 of type well known in the art wherein the leading and lagging edges of the pulses in the row A pulse train cause differentiator 51 to generate sharp impulses of positive and negative polarity respectively. These pulses are applied to a full-wave rectifier 53 of type well known in the art such that the negative pulses of the differentiated pulse train are inverted to provide a pulse train such as is shown by the rectified pulse train curve 24 in FIG. 2. It may be seen, therefore, that there is a sharp impulse corresponding to the beginning of every slot in row A, no matter what the binary representation for that slot is; in addition, there is an impulse representing the point at which the entire identification plate has passed in front of the sensor provided by the lagging edge of the end slot pulse (whether this is provided by end slot 10 or 10' depends upon whether the plate is moving from the right or from the left, respectively, as viewed by the sensor).

The pulse widths of the row A pulse train, curve 23, are variable in a manner determined by the speed at which the coded identification plate passes in front of the sensing device. Irrespective of what the pulse widths may be (and the pulse widths of the row A pulse train may even vary over one identification plate if the plate's velocity varies during one transit across the field of the sensing device), each of the impulses in the differentiated and rectified pulse train 24 marks the beginning of its slot. This must be so because these impulses are tied to the leading and lagging edges of each pulse in the row A train no matter what the pulse width may be. However, because of the slight time delay introduced by differentiator 51 and rectifier 53, the exact time of the pulses of train 24 slightly lags the actual commencement of the time slots of the row A pulse train (and also the row B pulse train curve 25).

The differentiated and rectified row A pulse train 24 is applied as an input to a twenty stage ring counter 22. A ring counter, as is well known in the art, may comprise a closed chain of bistable multivibrators or flip-flops coupled together in a manner such that only one of the flip-flops is, and can be, in the binary one state; each application of a pulse to the input of the ring counter transfers that binary one state to the next succeeding flip-flop. As a consequence, the location of the binary one in the ring counter is an indication of how many pulses have been applied as inputs to the ring counter. However, when the last flip-flop stage is in its binary one state and another pulse is applied as an input to the counter, the binary one state is transferred from the last flip-flop back to the first flip-flop. This continual cycling is the reason this counter is termed a ring counter.

The ring counter has one flip-flop for every impulse of pulse train 24. Thus, the first stage 20 is the end slot or end pulse flip-flop, the tenth stage flip-flop 19 is the center slot or center pulse flip-flop with the eight stages 11–18 between flip-flop 19 and flip-flop 20 corresponding to slots 1–8 or 1'–8' of the identification plate depending upon the direction of motion of the plate. The next to the last stage flip-flop 20 on the right is the end pulse flip-flop 20'. The very last flip-flop 21 on the right is the off-plate stage which indicates that the entire identification plate has passed by the sensor. This stage is placed in a binary one state when the off-plate impulse 21' of the differentiated and rectified row A pulse train 24 is applied to the ring counter input.

Referring to curve 24 and the ring counter, it may be seen that as this pulse train is applied to the ring counter the first or end slot pulse will place end pulse flip-flop 20 in the binary one state; the next pulse will transfer the binary one state from flip-flop 20 to flip-flop 11; the next pulse will transfer the binary one to flip-flop 12, and so on for the entire pulse train 24. Accordingly, a binary one is shifted down the entire ring counter 22 from the left-hand end pulse flip-flop 20 to the righthand end pulse flip-flop 20'. Finally, the very last or off-plate flip-flop 21 is responsive to pulse 21' of curve 24 indicating that the identification plate has passed from the view of the sensor. Flip-flop 21 remains in this logic state until the next identification plate passes by or the same identification plate passes by in the reverse direction. When that happens, of course, an end slot pulse is applied to the end pulse flip-flop 20 of the ring counter and the binary one of the off-plate flip-flop 21 is transferred around back to end pulse flip-flop 20.

The ring counter flip-flops 11–18 have outputs, each of which serves to condition or enable certain types of switching gates in a manner which will now be described. However, it is appropriate first to describe the logic operation of the gates used in FIG. 3. All digital logic circuits require devices to perform logic functions on the one hand, and storage or memory functions on the other. The logic functions in this system are performed by AND, OR, and NOR gates as represented in FIGS. 4a through 4c, respectively. The memory or storage is provided by the bi-stable multivibrator or flip-flop represented in FIGS. 4d and 4e.

NOR logic, which is well known in the art, is shown symbolically in FIG. 4c with inputs A and B and output C. Very simply, this logical function can be defined as follows: If, and only if, both the A input and the B input, are in the binary zero state can the C output be in the binary one state. In Boolean notation, $C=\overline{A}\cdot\overline{B}$. The AND gate FIG. 4a has its output C in the binary one state only if both its inputs A and B are in the binary one state, i.e., $C=A\cdot B$. The OR gate FIG. 4b has its C output in the binary one state only if one or both of its A and B inputs is in the binary one state, i.e., $C=A+B$.

There are many circuits for mechanizing the logic components represented in FIGS. 4a and 4c. However, particularly useful transistor logic circuits for use in this identification system are disclosed in a standard text on transistorized digital logic components entitled "Design of Transistorized Circuits for Digital Computers" by Abraham I. Pressman; John F. Rider, Publisher, Inc., New York, 1959.

The bi-stable multivibrator or flip-flop which is used primarily for storage or memory, is shown in FIG. 4d. This may be mechanized in accordance with the circuit in the Pressman text shown in FIGS. 11–7, at pages 11–296.

The logic of the multivibrator of FIG. 4d is represented in the truth table of FIG. 4e. In the device of FIG. 4d, it may be noted that the input to the set and reset trigger leads C and D are tied together such that C always equals D. In ordinary use in the following circuitry, the pulse train 24 is applied to this C–D input. In the truth table of FIG. 4e, the output states for the leads G and H are represented both before and after pulses are applied to C and D. Thus, the representation $G_N$ indicates the state of set output lead G prior to the application of the trigger pulse, while the representation $G_{N+1}$ indicates the state of the set output lead G immediately after the application of the trigger pulse. The notation for output lead H in the truth table is the same as for G. The convention herein adopted is that the logic value one applied on a lead means that a positive voltage is applied. The logic value zero, on the other hand, is used for the zero or reference voltage.

It may be noted that the set output lead G is fed back as the input steering lead A and the reset output lead H is fed back as the input steering lead B. This feedback constrains the flip-flop to change state every time a trigger pulse appears on the tied input leads C–D, i.e., the set and reset outputs G and H of the flip-flop change their state. This may be seen very readily by referring to the truth table of FIG. 4e. Thus, whenever there is a change in state from zero to one, on the $C=D$ lead, the output states G and H switch.

Referring again to FIG. 3, the set outputs of the the 12, 14, 16, and 18 flip-flops of the ring counter 22 are applied as one of the two inputs to AND gates 32, 34, 36, and 38, respectively. The second input to each of these AND gates is the row B pulse train, curve 25 of FIG. 2, derived from sensing the row B slots of the coded identification plate. Since the pulse train 24 sequentially steps the binary one state around the ring counter in synchronism with the timing of the row B pulse train applied to AND gates 32, 34, 36, and 38 (as may be graphically appreciated by viewing the curves 24 and 25 in FIG. 2), there is an output from an AND gate only when the stage of ring counter 22 coupled to that AND gate is in the binary one state and if the row B pulse train is at binary one for that slot of the plate associated with that stage of the ring counter and that AND gate. Since each of the slots 2, 4, 6, and 8 (and slots 2', 4', 6', and 8') in row A is always in the binary one state, it follows that there is a binary one output from those of AND gates 32, 34, 36, and 38 for which there is a binary one in the corresponding slot in row B. Reference to curves 24 and 25 demonstrates that for this plate the only AND gate that can have a binary one output is AND gate 38 and this happens only when the ring counter has cycled to stage 18.

Outputs from the 11, 13, 15, and 17 flip-flops of the ring counter are applied as inputs to NOR gates 31, 33, 35, and 37, respectively. These outputs are derived from the reset or binary zero output lead of the ring counter stages so that the NOR gates are enabled only when the ring counter cycles to stages 11, 13, 15, and 17. In manner similar to the AND gates, the NOR gates each have applied as a second input, row B pulse train 25. Thus, an output is obtained from a NOR gate only when it has been enabled by the appropriate ring counter stage and only if a binary zero exists for that slot in row B. This means that a binary one output occurs from a NOR gate only if row B for that slot is at binary zero.

The output leads of the four AND gates and four NOR gates are applied as inputs to the eight OR gates 41'–48' whose outputs are applied as trigger inputs to the eight storage flip-flops 41–48. Accordingly, any of flip-flops 41–48 can be in the binary one state if, and only if, the binary states of rows A and B are the same in the slot associated with that particular flip-flop. Flip-flops 41–48 correspond with slots 1–8, respectively, for one direction of motion of the plate and with slots 1'–8', respectively, for the opposite direction of motion.

Flip-flops 41–48 are an array of eight binary storage devices and the binary member number stored in these eight flip-flops is determined by the permutation of binary ones and zeroes disposed across the eight flip-flops. One convention for weighting the flip-flops in binary fashion is to treat the flip-flops as representing a binary number with bits in ascending order of significance from left to right such that flip-flop 41 represents the $2^0$ bit or decimal 1, flip-flop 42 represents the $2^1$ bit or decimal 2, flip-flop 43 represents the $2^2$ bit or decimal 4, up to the last flip-flop 48 which represents the $2^7$ bit or decimal 128. With the row B coding of the identification plate of FIG. 1, the binary representations for slots 1 through 8 (or 1'–8') indicate that the binary states of the output leads of flip-flops 41 through 48 would be, from left to right, as follows: 10100001. These states are graphically represented by curve 26 of FIG. 2. Comparison of curves 23 and 25 of FIG. 2 representing rows A and B pulse train waveforms shows that this binary number correctly represents the similarities and dissimilarities between the two channels on a slot by slot basis. With the decimal weightings for flip-flops 41 through 48 assigned above, it follows that this permutation of binary states represents decimal 1+4+128=decimal number 133. The leads of flip-flops 41 through 48 may be applied as inputs to a standard binary to decimal converter 55 with an output indicator in the form of an output printer or other display device.

The states of flip-flops 41–48 are set in accordance with a time sequence determined by how fast the identification plate passes before the sensing device. However, the entire logic circuit of FIG. 3 is asynchronous in operation as may be appreciated from the foregoing description. Thus, at the time slote 8 or 8' passes in front of the sensing device, all of flip-flops 41–48 have been set to their appropriate binary representation determined solely by whether the row A and row B representations are similar or dissimilar. Any time thereafter, it is appropriate to read the number stored in flip-flops 41–48 into binary-to-decimal converter 55. This may be readily accomplished by applying an output from one of the stages of the ring counter 22 as an enabling or read pulse to the binary-to-decimal converter such that the converter will do its reading only after all of the eight flip-flops 41–48 have been set in accordance with the dictates of the coded identification plate. In this particular embodiment, the read lead 50 is taken from the output of end pulse stage 20'. This insures that the coded number bearing slots of the identification plate have been ascertained and their representations stored in the flip-flops 41–48 before reading the outputs of those flip-flops into converter 55.

In order to reset the flip-flops 41–48 so as to prepare them to receive the binary number from the next coded identification plate, a reset pulse is applied to the reset input leads of all of flip-flops 41–48 through OR gates 41'–48' from off-plate stage 21 of the ring counter. Off-plate flip-flop 21 is placed in its binary one state by the very last pulse 21' of pulse train 24. It may be recalled that off-plate pulse 21' is derived from differentiating the trailing edge of the end slot pulse of row A last to be sensed on the plate. Thereafter, when the end slot pulse from the next-to-appear identification plate is applied to the ring counter it transfers the binary one state of off-plate flip-flop 21 back around to the end pulse flip-flop 20 and the entire decoding procedure may be repeated for the next plate.

In the description of the asynchronous logic circuit of FIG. 3, the convention was adopted that a similarity between row A and row B in a slot results in a representation of binary one in the code. However, it is just as appropriate to represent similarities as binary zero and dissimilarities as binary one. The states of flip-flops 41–48 for this new convention would be as represented in curve 27 which is the binary complement of curve 26. Accordingly, the number which the identification plate of FIG. 1 would represent in this convention is equal to the sum of 2+8+16+32+64 or decimal 122. One hundred twenty-two in binary notation is the complement of decimal number 133 in binary notation. There are several ways of implementing this new convention. One simple way is to take the outputs from flip-flops 41–48, not from the set or binary one output leads, but from the reset or binary zero output leads.

When starting up the automatic identification system, little need be done in order to place the logic circuit in a ready condition. In fact, all that really need be done is to set the ring counter 22 so that off-plate stage 21 is in the binary one state when the sensing device is not reading a plate. This may readily be accomplished by use of a manual switch (not shown) to apply reset pulses to the input to ring counter 22 until stage 21 is in the binary one state. In so doing the ring counter must of necessity cycle through the end pulse stage 20' immediately preceding the off-plate stage, thereby resetting storage flip-flops 41–48 to their reset or zero condition.

Although the coded identification system in accordance with the principles of the invention may be properly utilized with many types of physical coding indicia and sensing devices, in the preferred embodiment of the invention to be described below, the sensing is done by radiant energy in the form of X-rays and the code is represented in binary form as alternating areas of two types of materials having different response characteristics to X-radiation.

Figure 5:
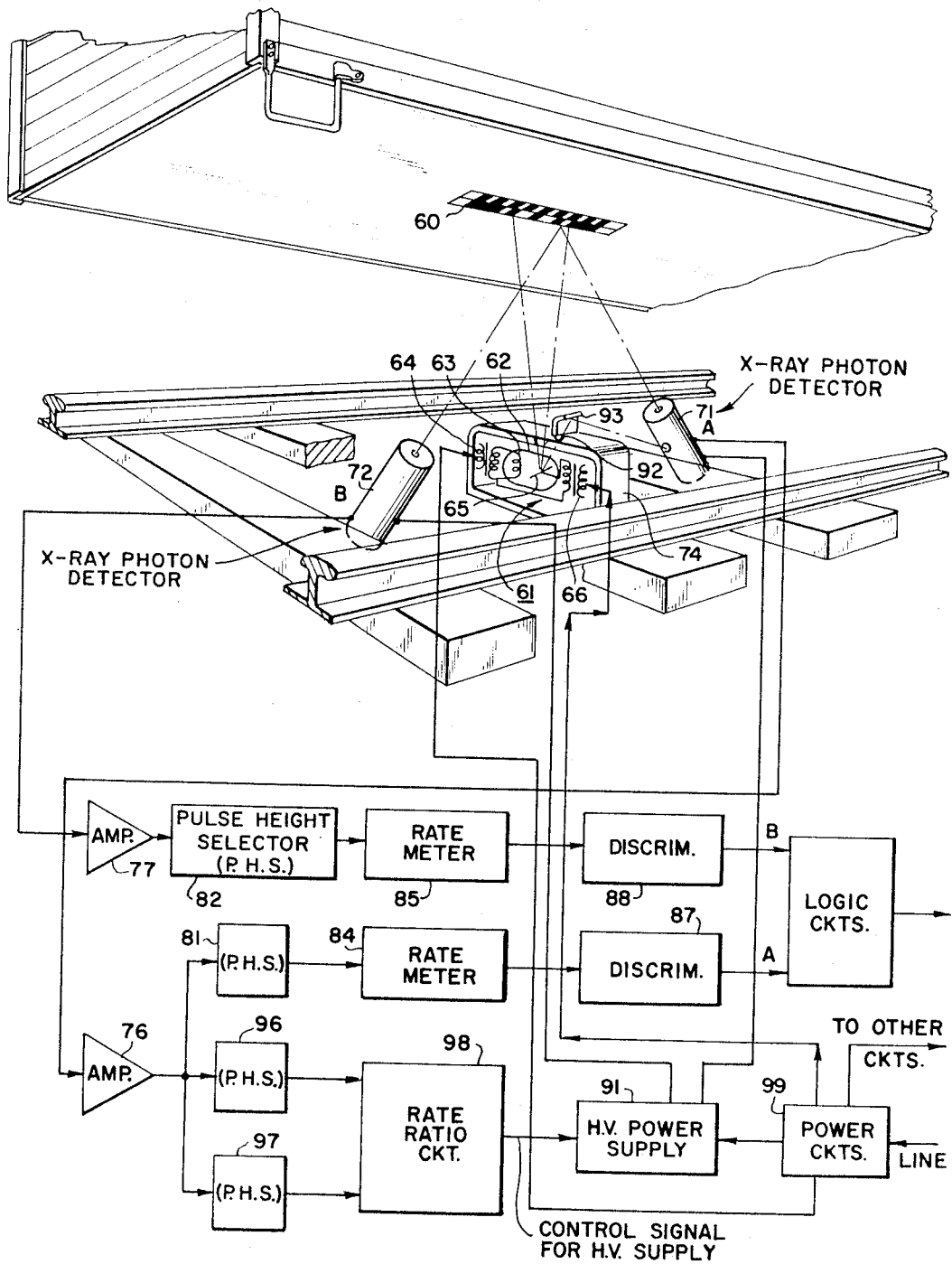
FIG. 5 is an X-ray sensing system used in the identification system of the invention.

In FIG. 5, X-radiation is applied from X-ray tube 61 over a distance to a coded identification plate 60 (similar in concept to the plate of FIG. 1). The binary one slots of plate 60 in both rows, comprise planar areas of lead which emit secondary radiation that is characteristic of lead when excited to the proper level. The binary zero slots are planer areas of steel which will produce a secondary radiation characteristic of steel that distinguishable from lead and is rejected. Detectors 71 and 72 which may be scintillation counters followed by photomultiplier tubes may be utilized to receive and amplify the secondary radiation from the row A and row B channels, whereby pulse-like outputs are derived therefrom dependent upon the geometric arrangement of the two different types of X-ray responsive materials.

Considering FIG. 5 in greater detail, coded identification plate 60 may be formed from a steel plate coated with lead; the binary zero slots are formed by scraping the lead from those areas to expose the steel surface; the remaining lead areas define the binary one slots. Plate 60 may be mounted on the underside of a railroad car with the X-ray generating source disposed at track level between, or mounted upon, the railroad ties and pointed upwardly for sensing identification plate 60. Tube 61 may be of conventional construction, including in envelope 62, a cathode 63 of the hot filament type connected to an excitation source 64, and an anode or target 65, maintained at a high potential, e.g., 150 kilovolts-peak, by a transformer 66. Tube 61 is shielded with an apertured, X-ray impervious sheath 74 to render the X-ray output directional and provide a fan-shaped beam directed at identification plate 60 so as to illuminate both the row A and row B channels of the plate. Disposed on either side of X-ray tube 61 are photon energy sensitive detectors 71 and 72, each of which may comprise a scintillation detector and photomultiplier. Each detector is shielded to render its field of view highly directional. On the righthand side of X-ray tube 61, detector 71 has a field of view restricted to the row A channel of plate 60. It is a sufficiently narrow field to encompass solely a portion of one slot. On the other side of tube 61, detector 72 is similarly directionally shielded to permit examination solely of the row B channel. The outputs of each of the detectors are applied to linear pulse amplifiers 76 and 77, respectively, and thence to the pulse amplitude or height selectors 81 and 82, respectively. The pulse amplitude selector in each of the two channels is appropriately calibrated to provide a "window" about the pulse amplitude appropriate for the $K_\alpha$ emission level for lead. Pulse height selectors of this type are well known in the art.

The outputs of pulse height selectors 81 and 82 are applied through rate meters 84 and 85, respectively, to amplitude discriminators 87 and 88, respectively. Pulse height selectors 81 and 82 insure that solely the outputs of the detectors due to the characteristic radiation for lead are applied to rate meters 84 and 85. The rate meters 84 and 85 function to produce an amplitude of voltage out corresponding to rate of pulses received due to lead $K_\alpha$ radiation. Discriminators 87 and 88 provide a low, or "0," level of output below a critical level of pulse rate or rate meter output and a high, or "1," level above. The critical level is chosen to optimize signal to noise ratio. The outputs of the discriminators for the row A and row B channels are applied to the logic circuit previously described in detail in connection with FIG. 3.

The X-ray high voltage transformer and tube are powered from a power control circuit 99, as is a high voltage D.C. power supply 91, to provide the required 1,000 volt D.C. potential for scintillation detectors 71 and 72. To insure that line potential variations do not result in variations in pulse output levels of the detectors in a manner to impair the accuracy of the readings, a feedback loop is provided to vary the high voltage power supply if such deviation in the line voltage occurs.

In manner well known in the art, such a feedback loop may be provided by applying an auxiliary output 92 through the sheath 74 about X-ray tube 61 which is applied to a molybdenum reference speciment 93. The characteristic radiation from reference 93 may be detected by either of detectors 71 or 72; in FIG. 5 it is detected by detector 71 for row A. There are two pulse height selectors 96 and 97, at the output of the linear amplifier 76, in parallel with each other and with the pulse height selector 81. Pulse height selector 96 is calibrated to pass pulses from the scintillation detector of amplitude greater than the average pulse height for molybdenum emission, while pulse height selector 97 passes below average amplitude pulses. The two pulses rates out from the pulse height selectors 96 and 97 are then applied to a pulse rate ratio circuit 98, the output of which in turn provides a control signal to the high voltage power supply 91. A rate ratio circuit particularly appropriate for use in accordance with the invention is disclosed in the U.S. Patent No. 3,040,983, by John E. Bigelow, which issued June 26, 1962. Clearly, if the pulse rate ratio is constant, this means that the gain of the detecting system is stabilized for the characteristic emission of molybdenum and thus is also stabilized for the characteristic emission of lead. Variations in the rate result in a control signal to circuit 91 which changes the potential to the detectors whereby a constant ratio and stabilization is restored.

There are many materials having appropriate emission levels other than lead which may readily be used for the purpose of coding the identification plate 60. Any metal may be used; many metallic oxides such as lead oxide, alumina, magnesia, and silica are appropriate; in addition, non-metals such as germanium and silicon may be utilized.

While the principles of the invention have now been made clear in the illustrative embodiments, there will be immediately obvious to those skilled in the art many modification in structure, arrangement, proportions, the elements, materials, and components, used in the practice of the invention, and otherwise, which are particularly adapted for specific environments and operating requirements, without departing from those principles. The appended claims are, therefore, intended to cover and embrace any such modifications, within the limits only of the true spirit and scope of the invention.

What is claimed as new and desired to be secured by Letters Patent of the United States is:

1. A digitally coded identification device comprising first and second channels of digitally coded indicia, each indicia being adapted to emit X-ray photons that are characteristic of an element comprising the particular indicia when the indicia are excited in sequence with electromagnetic radiation of predetermined energy, said first channel comprising indicia varying periodically over at least half said first channel, said second channel comprising indicia which vary relative to said varying indicia of said first channel, similarity between corresponding indicia in each channel indicating a binary information bit and dissimilarity between corresponding indicia in each channel indicating the absence of an information bit, thereby to define a unique coded numerical representation determined by the similarities or dissimilarities between consecutive pairs of indicia in said first and second channels.

2. A digitally coded identification device as recited in claim 1 wherein said indicia in said first and second adjacent channels extend along a dimension of said device with said indicia in each channel on one side of the midpoint of said dimension varying as the mirror image of said indicia in a corresponding channel on the other side of said midpoint.

3. A coded automatic identification system comprising a digitally coded identification device as recited in claim 2 mounted upon a movable object with said dimension of said device parallel to the direction of motion of said object, and means for sensing characteristic X-ray photons from said indicia which means are located at a point adjacent to the path of said movable object for separately sensing said indicia in said first and second channels and means controlled by the X-ray sensing means for generating separate trains of signals representative of said indicia in said first and second channels, respectively.

4. A coded automatic identification system as recited in claim 3 including an asynchronous logic circuit means coupled to said separate trains of signals for indicating whether said signals are similar or dissimilar in said first and second trains for each signal variation representative of indicia variation in said first channel at least for indicia one one side of said midpoint.

5. A coded automatic identification system comprising a digitally coded identification device as recited in claim 2 mounted upon a movable object with said dimension of said device parallel to the direction of motion of said object, means for sensing X-ray photons emitted separately from indicia in each channel and decoding means controlled by the X-ray sensing means in response to said indicia variations in said first and second channels for indicating a similarity or dissimilarity between said indicia in said first and second channels for each indicia variation in said first channel.

6. A digitally coded identification device comprising a rectangular plate with first and second rows of binary coded indicia, each indicia being adapted to emit X-ray photons that are characteristic of an element comprising the particular indicia when the indicia are excited in sequence with electromagnetic radiation of predetermined energy, said rows extending side by side along a dimension of said plate with the similarities, or dissimilarities, or both, between said first and second rows' binary coded indicia on one side of the midpoint of said dimension varying as the mirror image of the similarities, or dissimilarities, or both, respectively, between said first and second rows' indicia on the other side of said midpoint, and an electromagnetic radiation source adapted to project a narrow beam of radiation on indicia in a pair that comprises adjacent indicia in opposite rows, said radiation being sufficiently energetic to excite emission of X- ray photons that are characteristic of an element comprising the individual indicia.

7. A digitally coded identification device as recited in claim 6 wherein said indicia in said first row periodically alternate between binary values along a continuous length of said dimension of said plate equal to at least a multiplicity of periods and including said midpoint.

8. A coded automatic identification system comprising a digitally coded identification plate as recited in claim 7 wherein said binary coded indicia comprise a first class of areas on said plate representative of one binary value and a second class of areas distinguishable from said first class of areas and representative of the other binary value, a pair of characteristic X-ray photon counting means positioned to intersect characteristic X-ray photons emitted from each row respectively, and sensing means energized by the counting means for ascertaining whether or not an area of said first class in said first row is alongside an area of the same class in said second row.

References Cited by the Examiner
UNITED STATES PATENTS

| | | | |
|---|---|---|---|
| 2,952,008 | 9/1960 | Mitchell et al. | 340—174 |
| 3,238,358 | 3/1966 | Read | 235—61.12 |
| 3,238,501 | 3/1966 | Mak et al. | 340—146.3 |

FOREIGN PATENTS

| | | |
|---|---|---|
| 798,538 | 7/1958 | Great Britain. |

MAYNARD R. WILBUR, *Primary Examiner.*

J. I. SCHNEIDER, *Assistant Examiner.*